Figure 1:
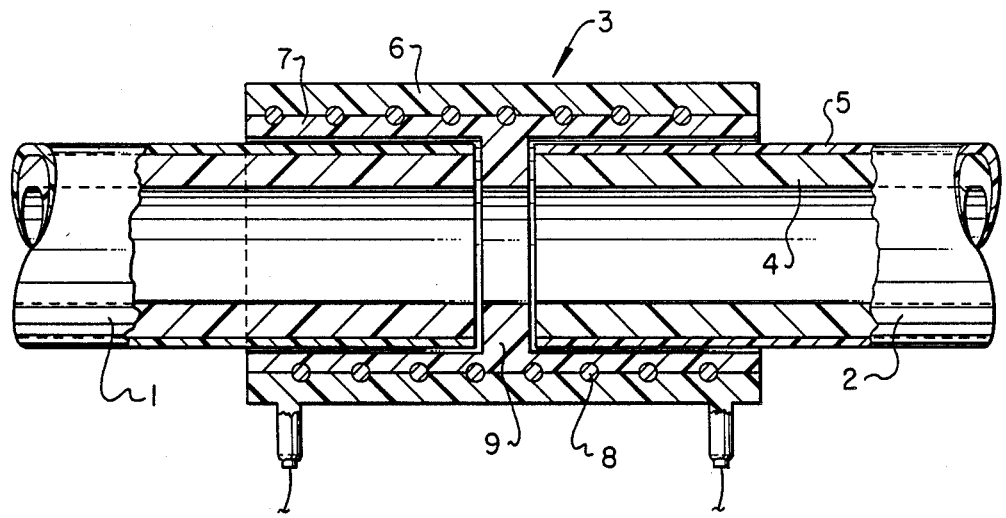

United States Patent [19]

Bourjot et al.

[11] Patent Number: 4,927,184
[45] Date of Patent: May 22, 1990

[54] PIPES BASE ON POLYOLEFIN RESIN FOR MANUFACTURING PIPELINES AND COUPLINGS FOR ASSEMBLING THEM

[75] Inventors: Pierre Bourjot, Maden; Marie-Anne Garnaud, la Garenne Colombe, both of France

[73] Assignee: Atochem, Paris la Defense, France

[21] Appl. No.: 157,888

[22] Filed: Feb. 19, 1988

[30] Foreign Application Priority Data

Nov. 7, 1986 [FR] France .................... 8615537

[51] Int. Cl.$^5$ .............................................. F16L 13/02
[52] U.S. Cl. ........................................ 285/21; 285/55; 285/369; 285/423; 156/244.13; 138/141
[58] Field of Search ................... 285/21, 55, 364, 423; 138/140, 141; 156/244.13

[56] References Cited

U.S. PATENT DOCUMENTS

| | | | |
|---|---|---|---|
| 3,943,334 | 3/1976 | Sturm | 285/21 X |
| 4,035,534 | 7/1977 | Nyberg | 138/140 X |
| 4,101,699 | 7/1978 | Stine et al. | 138/141 X |
| 4,327,726 | 5/1982 | Kwong | 285/21 |
| 4,634,615 | 1/1987 | Versteegh | 138/141 |
| 4,650,703 | 3/1987 | Kleinheins | 138/140 X |
| 4,656,070 | 4/1987 | Nyberg | 138/141 |

FOREIGN PATENT DOCUMENTS 2747840 5/1979 Fed. Rep. of Germany .
1477074 6/1977 United Kingdom .

Primary Examiner—Dave W. Arola
Attorney, Agent, or Firm—Sigalos, Levine & Montgomery

[57] ABSTRACT

Pipes and couplings for manufacturing pipelines comprising a wall having at least one layer of core material consisting essentially of a crosslinked polyolefin resin and at least one layer of surface material consisting essentially of a thermoplastic resin, said core material being crosslinked to a rate higher than 30%.

9 Claims, 1 Drawing Sheet

PIPES BASE ON POLYOLEFIN RESIN FOR MANUFACTURING PIPELINES AND COUPLINGS FOR ASSEMBLING THEM

SUMMARY

The present invention pertains to the design and the manufacture of pipes from polyolefin resin intended to form pipelines of great lengths for assembly by means of hot-weldable couplings 3.

The pipes 1 and 2 are each formed by a wall of a cylindrical tubular shape, which comprises two coaxial layers made from a plastic material: a core 4 on the inner side and a surface layer 5 on the outside. The core is formed by a first material resulting from the crosslinking in humid atmosphere of a composition based on a polyolefin resin grafted by reaction with a monomer carrying at least one hydrolyzable group to engage in condensation reactions, such as an unsaturated alkoxysilane. The surface layer is formed by a second material essentially comprising a polyolefin resin in the thermoplastic form which is hot weldable to itself.

The present invention pertains to the design and the manufacture of pipes from polyolefin resins intended to form pipelines of great length. It also pertains to the use of these pipes for manufacturing pipelines by assembling consecutive pipes end to end. More particularly, it intends to propose pipes possessing improved characteristics which can be used according to the same techniques and the same practices as those which are currently used as common practice in the installation of pipes made from polyolefin resins, more particularly from resins based on polyethylene.

It is known, for example, that pipes of this type are used for installing pipelines which are used for urban and interurban distribution of fluids, such as town gas, and that the common practice of assembling the consecutive pipes is by means of tubular couplings, which are also made from polyolefin resins and envelop the ends of two pipes placed end to end, these pipes being hot-welded to each other at these ends, especially on their circumference, the necessary heating being provided by means of electrical resistors incorporated in the mass of the couplings during their manufacture. It is understood that this assembly technique has been the subject of a long development, which implies that the installers of pipes have acquired a permanent know-how and it is desirable not to modify it.

It is also understood that this technique utilizes the ability of the thermoplastic materials based on polyolefin resins, more particularly polyethylenene and ethylene copolymers, of being hot-welded to themselves when they are softened by heating. However, these materials also have a certain number of disadvantages, particularly a tendency to creep during long-term exposure to pressure or during exposure to elevated temperature, risks of cracking under mechanical stress, low resistance to certain chemicals and a certain sensitivity to abrasion during installation in the ditch. For pipelines which must withstand the pressure of fluids being carried, as well as mechanical or chemical agents to which they are subjected on the inside or the outside during their useful lives of several dozen years, it is necessary to use pipes of great thickness. However, the price of these pipes is high, not only because of the necessary amount of material involved, but also as a consequence of the relatively low pace of production, which is due to the limited output of the extruders used to manufacture such pipes. In addition, the weight and the size also represent, of course, disadvantages in connection with the transportation of the pipes and the installation of the pipelines.

To eliminate these insufficiencies of the prior-art pipes while maintaining the assembly technique, the present invention proposes pipes based on polyolefin resin for the manufacture of pipelines of great length, characterized in that they comprise a wall formed by at least two layers made intimately in one piece, comprising at least one core made from a first material based on crosslinked polyolefin, preferably resulting from the crosslinking in humid atmosphere of a composition based on a polyolefin resin grafted by a reaction with a monomer carrying at least one hydrolyzable group to engage in condensation reactions, such as an unsaturated alkoxysilane group and at least one surface layer formed by a second material essentially comprising a polyolefin resin in the thermoplastic and hot-weldable form.

Depending on the applications for which the pipes according to the present invention are most often intended, the above-mentioned surface layer is advanvantageously present on the outside of the pipes, enveloping the core. However, the use of the present invention is not limited to this relative disposition. In contrast, the surface layer may cover the external surface of the pipe only partially, or in certain cases, there may be provided a thermoplastic surface layer which can be welded to the inner surface of the pipe in addition to or as a replacement for the surface layer formed on the outside.

In combination with pipes whose wall comprises a thermoplastic surface layer around a core made from a crosslinked material, it is especially advantageous to use assembly couplings for assembling these pipes, which are made from an analogous material, but with the thermoplastic surface layer on the inner face relative to the core to achieve assembly by hot welding of this inner layer to the thermoplastic layer present on the outside of the pipes at their ends placed end to end.

Consequently, the present invention also pertains to a tubular assembly coupling for assembling the above-mentioned pipes to form pipelines of great length, which are characterized in that they comprise at least one core formed by a material analogous to that of the said pipes and a surface layer analogous to that of the said pipes, which is suitable for being welded to the latter by welding means which ensure the welding of the said couplings.

These welding means are advantageously formed by an electrical heating means embedded in the said couplings.

Such couplings can, of course, be straight, bent or comprise several branches, e.g., in the shape of a T or Y, to prepare any type of branching or diversion in pipelines.

According to other embodiments, the pipes according to the present inventioncan be designed to permit direct assembly of the pipes with each other at the ends of the consecutive pipes inserted into each other. An assembly technique is now used which represents common practice in the installation of pipelines made from thermoplastic pipes in homes, which essentially consists of dilating the end of one pipe to form a bell into which the end of the pipe to be connected is inserted and heating the assembly around the bell to ensure welding. The welding consequently takes place between the outside of a pipe and the inner face of the other at the level of the bell. This is why the pipes according to the present invention comprise two thermoplastic surface layers for this application: on the inner face and on the outer face of a tubular core made from a crosslinked polyolefin resin.

For the assembly of the pipes with each other according to any of the above-mentioned techniques, the use of a crosslinked polyolefin resin for the core of the pipes offers the additional advantage of leading to a hot-cross-linkable material. This property can be utilized to ensure favorable pressure forces for efficient welding.

When manufacturing pipes according to the present invention, and possibly also in the manufacture of the assembly couplings, intimate connection can advantageously be achieved, which causes the surface layer to be intimately attached to the core by shaping the materials forming it by extrusion or by injection before inducing the crosslinking of the composition forming the core.

Thus, the present invention also pertains to a process for manufacturing the pipes and/or couplings, which is characterized in that it comprises the preparation of a composition based on a thermoplastic polyolefin to form the surface layer and the preparation of a composition based on a polyolefin and an unsaturated alkoxysilane for the core, the use of the said compositions by coextrusion to prepare a tubular member, in which they form two coaxial layers forming the wall of the said member and the exposure of the said member to a humid atmosphere which provokes the crosslinking of the composition forming the core.

It should be noted here that the grafting of the alkoxysilane and the crosslinking leading to a crosslinked core resin can be carried out in two steps or in a single step. In the first case, the composition to be extruded already contains the alkoxysilane grafted to the polyolefin chain by opening its unsaturated bond, while adding, if desired, conventional additives which facilitate crosslinking after extrusion, whereas in the second case, chemical grafting is carried out during the extrusion at the extrusion temperature and in the presence of conventional initiators introduced into the composition for this purpose.

It is easy to understand that the number of layers is not necessarily limited to two either during the coextrusion operations or during the formation of the walls of the tubular members. In contrast, it can be advantageous, for example, to provide an intermediate layer between the core and the surface layer, or to provide a series of intermediate layers having compositions progressively varying from one layer to the next. In the preferred embodiment of the present invention, in which the same polyolefin resin is used as the essential constituent of the core as well as the surface layer, the percentage of alkoxysilane and consequently the rate of crosslinking of the polyolefin can especially be varied progressively from one layer to the next, it being understood that this rate of crosslinking must remain sufficiently low on the surface of the pipe to permit welding, and that in the layer forming the core, it must be relatively high and sufficient to ensure the improvements sought in terms of mechanical strength and long-term behavior for the entire system.

It is generally considered from this point of view that the rate of crosslinking in the material of the core must be higher than 30%, especially between 50% and 70%.

For the surface layer, the rate of crosslinking may be zero, but it may also be between, e.g., 2% and 5%, which offers the advantage of leading to improved shearing strength without appreciably affecting the weldability.

The compositions of polyolefin polymers and copolymers crosslinked with unsaturated alkoxysilanes are known per se. The essential interest in these compositions in the present invention is that at reduced wall thickness and consequently at lower weight and lower manufacturing and processing costs. these compositions lead to improved performance in the use of the pipes based on polyolefins, especially in terms of mechanical strength and long-term behavior. It was possible to confirm in this respect, especially by pressure creep tests, that the strength of the pipes according to the present invention is maintained for much longer times than that of the conventional types in the case of equivalent supportable stresses at the beginning of use, which is eminently favorable for the applications in the manufacture of pipelines. Other properties are also improved, such as wear resistance and the resistance to corrosive chemical effects, and it is of little significance in this case if the surface layer which possibly remains accessible along the pipes is relatively fragile beginning from the moment it played its role in the welding of the ends during the assembly of the pipes.

The constituents to be used in the compositions used to manufacture the pipes according to the present invention and possibly their assembly couplings are known themselves, and so are the criteria on the basis of which they are selected and on the basis of which their proportions are determined. For example, it is often desirable, according to the present invention, to use polyethylene or polypropylene as the basic thermoplastic polymer, preference being given to polyethylene, or copolymers of ethylene or propylene with compatible monomers, such as propylene (for ethylene), ethylene chloride or vinyl acetate.

Concerning the grafting and crosslinking agents used in the composition forming the core of the tubular members, these agents can advantageously be selected among the silanes containing, on the one hand, a double ethylene bond for the grafting, and on the other hand at least one, preferably at least two, groups capable of giving rise to condensation reactions by hydrolysis, the latter groups being especially alkoxy groups containing 1 to 4 carbon atoms, such as methoxy and ethoxy radicals. A preferred example of such a silane is vinyl trimethoxysilane. The compositions can also contain conventional secondary constituents, including, in particular, radical polymerization promoters and hydrolysis catalysts of alkoxysilanes.

Some particular embodiments of the present invention will now be described in more detail; they will help better understand the essential characteristics and advantages, it being understood, however, that these embodiments are selected as examples and the present invention is by no means limited by them. The description is illustrated by FIGS. 1 and 2 in the attached drawings; these figures schematically show, in a partial cutaway, the ends of two pipes placed end to end with a corresponding assembly coupling in FIG. 1, the ends of two pipes assembled with each other in FIG. 2.

Figure 2:
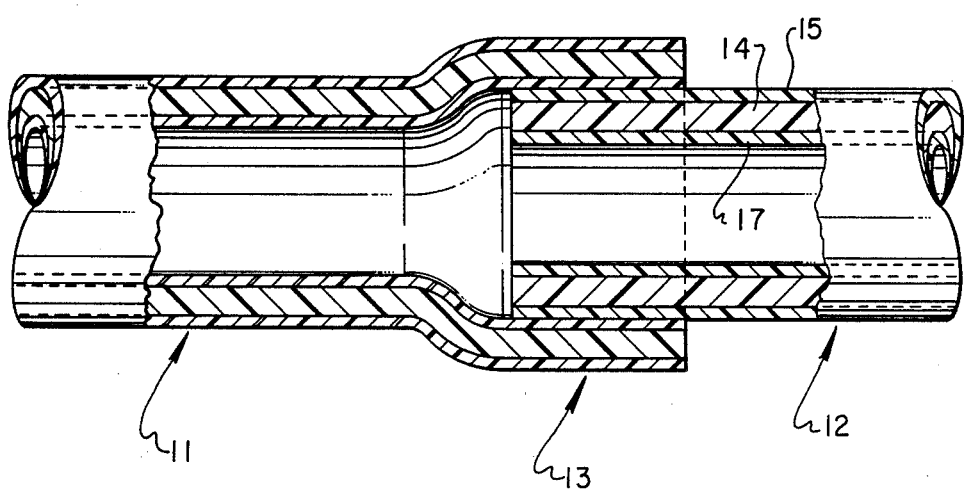

In FIG. 1, the two pipes are designated by the reference numerals 1 and 2, while the assembly coupling is designated by the reference numeral 3. It is seen that each of the pipes 1 and 2 is formed by a wall of a cylindrical tubular shape, which comprises two coaxial layers consisting of a plastic: a core 4 on the inner side and a surface layer 5 on the outside. In a complementary fashion, the coupling 3 is dimensioned to surround the ends of the two pipes, without any notable clearance, and its wall also comprises two coaxial cylindrical layers, but the core 6 is disposed on the outside and the surface layer 7 is disposed on the inner side. The coupling 3 also comprises welding means formed by an electrical resistor schematically indicated by the reference numeral 8, which is embedded in the mass of the coupling, essentially at the interface between the two layers.

It is easy to understand that these welding means can also be made by heating the coupling from the outside, as will be described below.

In the particular embodiment being considered here, it is assumed that the pipes according to the present invention are manufactured by extrusion, whereas the couplings can be made either by extrusion or by injection, without their properties being affected hereby. However, in all these cases, the tubular member — the pipe or the coupling — is made from appropriate compositions and to the desired dimensions, with their two layers being in intimate contact with each other, before inducing the crosslinking of the crosslinkable composition used for the core. This is how their definitive attachment to each other is ensured.

As an example, two different compositions based on polyethylene are prepared, and they are charged to the feed end of an extruder with two concentrical canals at a temperature on the order of magnitude of 150° C. to 250° C. The first composition, which is fed into the outer canal, is polyethylene having a density of 0.956 and a fluidity index of 0.1 at 190° C. under 2.16 bars. The second one is a crosslinkable polyethylene composition which contains, besides the polyethylene, vinyl trimethoxysilane at a ratio of 1 to 2 wt.% relative to the total weight of the composition, as well as dicumyl peroxide in a proportion of 0.05 to 0.2 wt.% and dibutyltin dilaurate in a proportion on the order of magnitude of 0.05 wt.%. This graftable and crosslinkable polyethylene has a density of 0.948 and a fluidity index of 0.2 under 2.16 bars at 190° C. The heating in the mixer of the extruder induces the grafting of the vinyl silane to the polyethylene chain by opening the ethylenic double bonds, which is facilitated by the organic peroxide.

The tubular member having two coaxial layers, which is obtained at the discharge end of the extruder, is cut into sections having the desired pipe length, and these pipes are stored for a few days exposed to the humidity of the ambient air. This causes the crosslinking of the composition forming the inner layer by hydrolysis of the trimethoxysilane groups grafted and by condensation of the silanols, this reaction being catalyzed by the tin salt present in the composition. In the finished pipe, only this inner layer, which, however, accounts for most of the wall thickness, is crosslinked, whereas the external surface layer remains in the thermoplastic form.

The following dimensions are found in the section:
outside diameter of the pipe: 32.1 mm
overall wall thickness: 3.1–3.2 mm
thickness of the outer layer: 0.4 mm, mean value.

Sections of a length of ca. 20 cm are cut off from the tubular member obtained at the discharge end of the extruder, perpendicular to the axis, for strength tests, and these sections are subjected to hydrolysis in water for eight hours at 80° C. to ensure crosslinking. After drying, two pieces each are assembled end to end by means of conventional hot-weldable couplings of the type commercially available under the name "Innogaz".

The specimens thus obtained are subjected to a hydrostatic pressure in a tank at 80° C., the hydrostatic pressure being such that the stress $\sigma$ is 4 MPa if this stress is calculated from the formula: $\sigma = P(D-e)/2e$, in which D is the outside diameter of the pipe, e is the overall wall thickness, and P is the internal pressure in the pipe. This pressure equals here 0.85 MPa or 8.5 bars.

The stress is maintained for 8,800 hours on four similar specimens without the slightest failure being able to be observed.

After a rest for 24 hours at 20° C., the same specimens are subjected to a pressure of 20 bars for 168 hours. No bursting is observed.

In a variant of the preceding example, the grafting and the crosslinking of the vinyl methoxysilane can be carried out in two different steps, one before and the other after the extrusion. The starting material used in this case is a polyethylene that was grafted in advance by heating, extrusion and granulation with a mixture containing polyethylene, vinyl trimethoxysilane and the organic peroxide added as an initiator, a master batch containing the hydrolytic condensation catalyst being added to the said polyethylene in the feed hopper of the extruder. The composition has a fluidity index of 0.5 under 5 bars at 190° C.

The percentage of the water-soluble unsaturated silane can thus be varied within a broader range. e.g., between 0.5 and 5 wt.% relative to the total weight of the composition.

According to another variant, the overall wall thickness of the pipes is between 10 mm and 15 mm for pipes with an outside diameter of 150 mm. The thickness of the hot-weldable surface layer may vary. e.g., between 0.1 mm and 2 mm, more generally between 0.05 mm and 5 mm.

Compared to the conventional polyethylene pipes, the present invention makes it possible, on the whole, to very substantially increase the long-term pressure resistance without creep, to considerably improve the mechanical properties at elevated temperature, to eliminate the risks of cracking to increase the resistance to chemical agents and to improve the wear resistance. All these improvements can also lead without any risks — to a reduction of the pipe thickness on the order of magnitude of 50% compared to the thickness of the pipes currently manufactured exclusively from thermoplastic materials, which implies considerable technological and economic advances, especially along with a considerable reduction of the material costs, a commensurate increase in the pace of production and an appreciable increase in the carrying capacity of the pipeline networks due to the increased cross section of the central hole of the pipes.

At the same time, these pipes can be assembled without difficulty by hot welding on the outer surface layer according to the usual technique. Couplings which are currently available commercially, such as the above-mentioned coupling, can be used for this purpose. However, these [couplings]can also preferably be replaced by couplings which are also manufactured by the process according to the present invention, as is illustrated in FIG. 1.

Such couplings comprise a crosslinked polyethylene layer 6 on the outer surface, and they offer the same advantages in terms of mechanical stress as well as thermal and chemical resistance as the pipes. Moreover, if it [layer]is heated, it is subject to a contraction exerting a pressure on the pipes, which is favorable for the welding. The hot-weldable inner layer has a thickness of. e.g.. 1 mm to 4 mm, and the resistor incorporated in the coupling permits this coupling to be heated to a temperature on the order of magnitude of 150° C. to 200° C. to bring about its welding to the outer surface layer of the pipes. Moreover, the polyethylene of the coupling, at least in this hot-weldable layer, is preferably a copolymer formed with vinyl acetate in a proportion of, e.g., 30 wt.% relative to the weight of the mixture, so that its adhesion capacity by hot welding is improved.

Finally, it is apparent from FIG. 1 that the inner layer of the coupling extends in the form of an internal crown 9 in the median part of the sleeve. During the end-to-end assembly of the two pipes, this crown will be intercalated between the ends of the pipe walls.

In the embodiment illustrated in FIG. 2, the pipes 11 and 12 according to the present invention can be assembled with each other without any need to use special couplings. These pipes are made from the same compositions as above, but by coextruding three coaxial layers. The central layer forms the core 14, which is made from a material based on a crosslinked polyolefin. The outer layer 15 and the inner layer 17 are two surface layers made from a polyolefin resin which remains in the thermoplastic and consequently hot-weldable state. In industrial manufacture, the pipes cut off at the discharge end of the extruder are transferred into a tunnel furnace in which they are exposed to a water vapor atmosphere saturated at 100° C., in which the pipes are left for ca. two hours. The crosslinking thus achieved only affects the core of the pipes, leading only to binding of the grafted polyolefin to the silane.

To assemble the two pipes 11 and 12, a bell 13 is first formed by heating the end of the pipe 11 to its softening point while introducing into it a mandrel having a diameter that is practically equal to the outside diameter of the pipe 12. The bell is allowed to cool to ambient temperature and to cure around the mandrel before the latter is withdrawn. The cooperating end of the pipe 12 is then introduced into the bell 13, and the said bell is heated from the outside to an appropriate temperature to ensure hot welding of the inner surface layer of the pipe 11 to the outside surface layer of the pipe 12. The final cooling of the bell causes its contraction due to the inherent nature of the crosslinked polyolefin resin forming the core, which additionally increases the efficiency of the adhesion between the two thermoplastic layers welded together.

The present invention is not, of course, limited by any means to the particularities which were specified in the above description or to the details of the particular embodiments selected to illustrate the present invention. Any variant is possible without going beyond the scope of the present invention. Thus, the present encompasses all the means which represent technical equivalents of the means described, as well as their combinations.

We claim:

1. Pipes for manufacturing pipelines of great length by end-to-end assembly, comprising a wall having at least one layer of core material consisting essentially of a crosslinked polyolefin resin and at least one layer of surface material consisting essentially of a thermoplastic resin, said core material being crosslinked to a rate higher than 30%.

2. The pipes of claim 1, wherein the said crosslinked core material is obtained by crosslinking in a humid atmosphere a composition based on a polyolefin resin grated by a reaction with a monomer containing at least one hydrolyzable group to give rise to condensation reactions.

3. The pipes of claim 1 or 2, wherein the said layer of surface material is present on the outside of the said pipes, forming an envelope around the said crosslinked core material.

4. The pipes of claim 1 or 2, wherein said pipes are prepared by coextrusion of the core and of the surface material layers before crosslinking of the polyolefin resin forming the core material.

5. The pipes of claim 1 or 2 wherein they comprise two layers of surface material disposed on the inner face and the outer face of the tubular core respectively.

6. Tubular couplings for the assembly of the pipes of claim 3, wherein said couplings comprise at least one layer of core material analogous to that of the pipes of claim 3 and a layer of surface materials analogous to that of the pipes of claim 3, suitable for being welded to the latter by welding means.

7. Couplings in accordance with claim 6, wherein welding means are formed by an electrical heating resistor embedded in the said couplings.

8. Couplings in accordance with claim 6, wherein they comprise an annular crown forming a radial extension of the said layer of surface material in a median zone of the coupling for being intercalated between the ends of two consecutive pipes disposed end to end for assembly by means of the said coupling.

9. The pipes of claim 1 or 2 wherein said core material consists essentially of a crosslinked polyethylene or a crosslinked polypropylene and said surface material consists essentially of a thermoplastic polyethylene or a thermoplastic polypropylene.

* * * * *

UNITED STATES PATENT AND TRADEMARK OFFICE
CERTIFICATE OF CORRECTION

PATENT NO. : 4,927,184

DATED : May 22, 1990

INVENTOR(S) : Pierre Bourjot, et al.

It is certified that error appears in the above-identified patent and that said Letters Patent is hereby corrected as shown below:

Column 8, line 23, correct "grated" to read -- grafted --.

Signed and Sealed this

Seventeenth Day of September, 1991

Attest:

HARRY F. MANBECK, JR.

*Attesting Officer*  *Commissioner of Patents and Trademarks*